United States Patent [19]
Ford

[11] Patent Number: 5,811,006
[45] Date of Patent: Sep. 22, 1998

[54] CENTRIFUGAL SEPARATOR WITH IMPROVED QUIESCENT COLLECTION CHAMBER

[75] Inventor: Steven D. Ford, Clovis, Calif.

[73] Assignee: Claude Laval Corporation, Fresno, Calif.

[21] Appl. No.: 719,136

[22] Filed: Sep. 25, 1995

[51] Int. Cl.[6] ............................. B01D 21/26; B01D 21/24

[52] U.S. Cl. ...................... 210/512.1; 210/519; 210/521; 210/532.1

[58] Field of Search ................................ 210/512.1, 519, 210/521, 532.1; 209/733

[56] References Cited

U.S. PATENT DOCUMENTS

| | | | |
|---|---|---|---|
| 4,865,751 | 9/1989 | Simisson | 210/532.1 |
| 5,368,735 | 11/1994 | Ford | 210/512.1 |

*Primary Examiner*—David A. Reifsnyder
*Attorney, Agent, or Firm*—Donald D. Mon

[57] ABSTRACT

A separator for separating solids from a liquid/solid stream. The separator has a cylindrical separation chamber in which the stream is subjected to centrifugal forces against a separation wall. An exit port near the bottom of the separation chamber passes solids and some liquid to a lower sump. A plurality of axially and radially extending vanes in the sump quiet the movement of the solids. Optionally the vanes can extend into a quiescent region above the exit port.

4 Claims, 2 Drawing Sheets

CENTRIFUGAL SEPARATOR WITH IMPROVED QUIESCENT COLLECTION CHAMBER

FIELD OF THE INVENTION

Centrifugal separators for separating particulate matter from a whirling liquid stream.

BACKGROUND OF THE INVENTION

A well-known type of liquid/solid separator is shown in Ford Pat. No. 5,368,735, issued Nov. 29, 1994. That patent and this patent application are commonly owned by the same assignee, and have the same inventor.

In a separator of this type, a pressurized stream of liquid and entrained solids is injected tangentially into a cylindrical separation barrel. As the stream whirls downwardly, the solids move toward the wall of the barrel, and the less dense liquid remains closer to the axis. At the bottom of the tube is a spin plate which reverses the spin of the liquid. The clarified liquid then flows centrally upward and out of the top of the barrel.

Exit ports are located near the bottom of the barrel. Liquid with an enhanced burden of solids flows through these exit ports into a collection chamber. Solids settle in this chamber can be withdrawn from the bottom.

There is a reduced but still substantial flow into and out of the collection chamber. It is an object of this invention to maintain the collection chamber in as quiescent a condition as possible so as to facilitate the settling of the solids in the collection chamber, and also to reduce the re-entrainment of solids into the liquid which is returned from the collection chamber to the separation chamber.

BRIEF DESCRIPTION OF THE INVENTION

A liquid/solid separator according to this invention includes an inlet chamber from which a stream of mixed liquids and solids is tangentially injected into a separation barrel. The separation barrel has a peripheral wall which is a surface of revolution. The resulting spinning stream flows axially toward a spin plate, which reverses the axial direction of flow and reflects the stream upwardly as the central part of a vortex. This central part flows through and out of a central outlet barrel. Exit ports (which may instead be a slot) adjacent to the spin plate exit into a collection chamber, in which collected solids accumulate, and from which they are removed continuously or periodically.

According to a feature of this invention, a plurality of vertical baffles extend downwardly into the collection chamber to reduce turbulence and circular flow of the solid-laden liquid, and also to reduce re-entrainment of solids into the separation chamber.

The above and other features of the invention will be fully understood from the following detailed description and the accompanying drawings, in which:

DETAILED DESCRIPTION OF THE INVENTION

Figure 1:
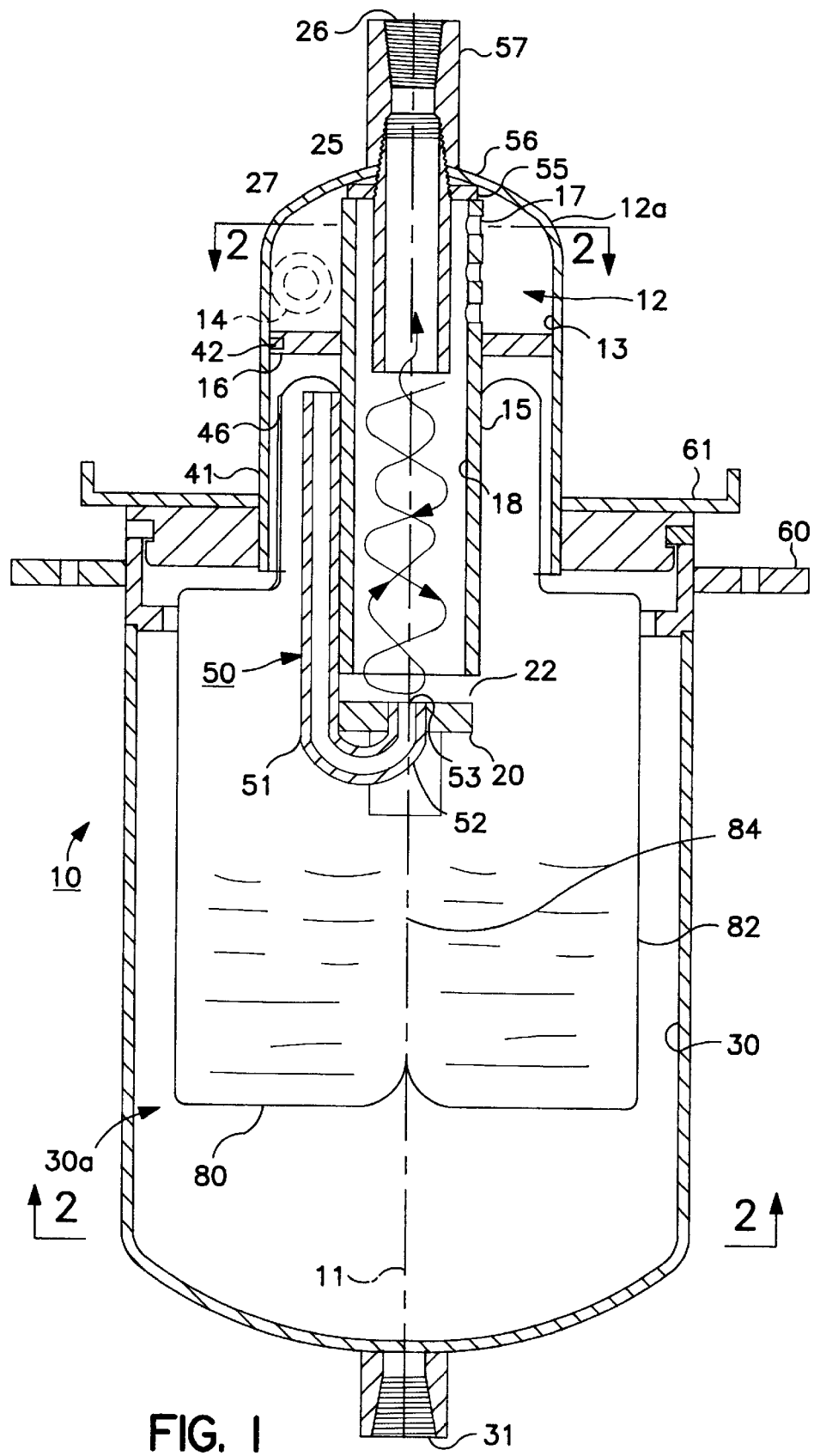
FIG. 1 is an axial cross-section of the preferred embodiment of the invention.

A liquid/solid separator 10 according to this invention is shown in FIG. 1. The separator has a central axis 11. An inlet chamber 12 formed by an inlet barrel 12a receives liquid/solid mixtures or suspensions from which the solids are to be separated. The wall 13 of the inlet chamber is preferably a surface of revolution. Inlet port 14 discharges the mixture tangentially into the inlet chamber, imparting a strong spin to the stream. In this specification the term "surface of revolution" is used in its geometric sense of a surface generated by a generator line revolved around a central axis. The surfaces referred to in the specification are not intended to rotate.

A separation barrel 15 extends axially through the inlet chamber, and extends well below it. A seal plate 16 seals between the inner wall of the inlet chamber and the outer wall of the separation barrel. Inlet orifices 17 extend through the wall of the separation barrel in the inlet chamber. Orifices 17 are tangentially oriented, and face in the direction of the spin imparted by inlet port 14 against wall 13 of the inlet chamber. Together these generate a strong spinning movement of the stream which flows around inside wall 18 of the separation barrel, and downwardly. Wall 18 is a surface of revolution, usually a cylinder.

A spin plate 20 is an axial adjacency to the lower end 21 of separation barrel 15. It extends laterally across lower end 21 and except for exit port 22 would close the lower end of the separation barrel. As illustrated, exit port 22 is a continuous slit formed by spacing the spin plate from lower end 21. If preferred, the exit port could be formed as a group of individual ports formed in the wall of the separation barrel, in which event the spin plate would close the lower end of the separation barrel. In fact, except for the continuous slit as shown, it would close it.

An outlet barrel 25 exits the separation barrel at its upper end. Fluid which has passed through the separation barrel exits through outlet 26 from the outlet barrel. The outlet barrel is also useful in forming the spinning stream from the inlet orifices, because it is aligned with them and extends part way into the separation barrel. This provides an annular region 27 which initially radially confines the stream.

A collection chamber 30 includes a collection portion 30a below the spin plate to receive material which is passed through the exit port. A drain fitting 31 is formed in the bottom of the collection chamber. The collection chamber is shown as a rigid structure. However, a removable, replaceable flexible bag could instead be provided. The size of the collection chamber will in part be determined by the amount of solids to be collected before removal, or whether removal will be continuous. In any event, it should be large enough to receive and to hold a sufficient amount of material to enable at least some settling of solids to occur. It should be remembered that what flows into the chamber is an enriched liquid/solid mixture (increased solids content per unit volume), and removal of clarified supernatant liquid and its return to the system is to be encouraged.

For this purpose, collection chamber 30 also includes a substantial quiescent region 46 above the level of the exit port. This is most conveniently formed as a downwardly extending skirt 41 from the inlet chamber wall. It joins to a seal 42 at the top of the collection chamber wall. Thus, the solid portion of the material which has passed through the exit orifices can settle and clarified/or partially clarified supernatant liquid can rise above the exit ports. It is an advantage of this invention that removal of this clarified liquid enables a steadier flow of material through the orifices, including considerably more net solid material per unit time.

To enable this function, a conduit 50 extends from the quiescent region, preferably near the top thereof, to a region of lesser pressure in the vortex.

This device can conveniently be made separable for convenience in servicing it. Arm 51 of the conduit may be welded to the side of the separation barrel, and a second arm 52 rises and passes through an opening 53 in the center of the spin plate. This also serves as a structural joiner for the spin plate so as to space it from the bottom of the separation barrel by the width of the exit port.

The exit port when provided as a slot will be continuous around the separation barrel except where occluded by the conduit.

The upper end of the separation barrel is attached by weldment 55 or if preferred by threads to a flange 56 formed on the outlet barrel. The outlet barrel may conveniently be threaded into a coupling 57 which bears against the outer housing.

The collection chamber is provided with a joinder flange 60 and a seal which together with a flange 61 on the outer wall of the inlet chamber, enable the collection chamber to be detached. The separation barrel and the outlet barrel can be removed as a unit by unscrewing the outlet tube from the neck. This is a conveniently manufactured and serviced unit.

The separator as described this far is disclosed in Ford Pat. No. 5,368,735. This invention improves the quiescence of both the quiescent region 46 and of the sump region 30*a* by interrupting circular motion in the collection chamber. Also, it will reduce the re-entrainment of solids back into the separation chamber.

Figure 2:
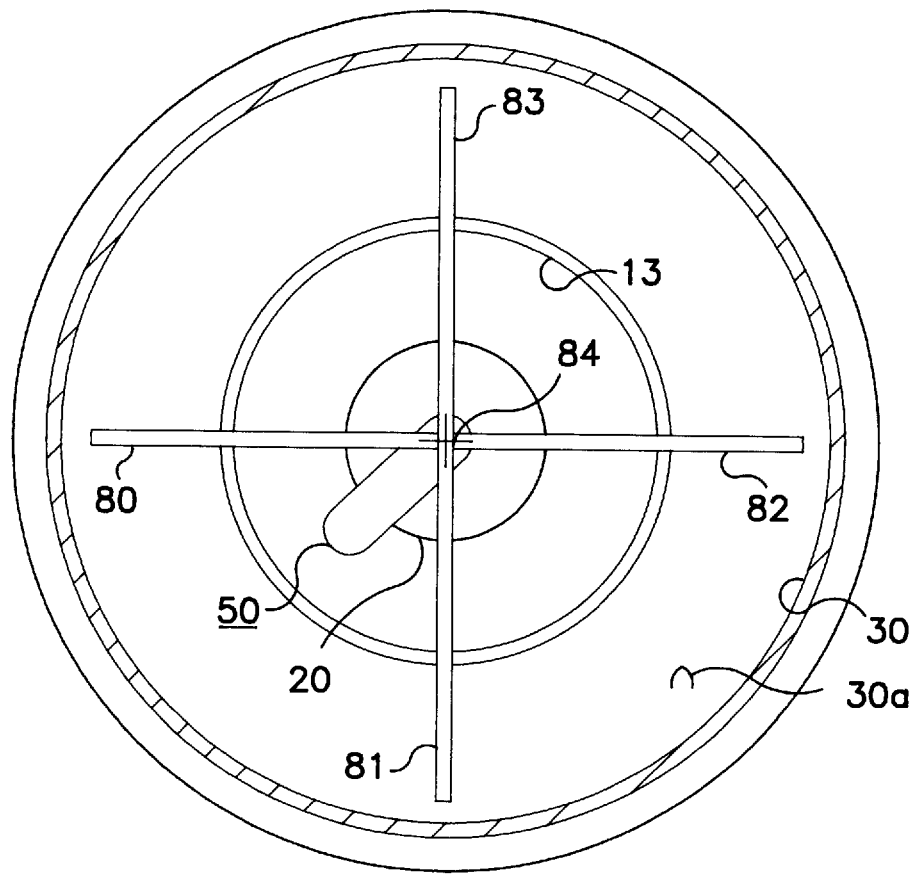
FIG. 2 is a cross-section taken at line 2—2 in FIG. 1.

This is accomplished by a plurality of axially extending baffles 80, 81, 82 and 83. As best shown in FIG. 2 they form a cruciform patten with their intersection 84 on the axis. Best results are attained if there is a clearance around their side and bottom edges for flow, as well as over their top edges. Four are shown; fewer or more can be used as preferred.

The baffles do not impede the function of the separator. They merely reduce the turbulence in it, and by partially compartmenting the quiescent zone and sump region, they facilitate the settling out of the solids in the collection chamber, and reduce their re-entrainment into the separation chamber. While the vanes can extend to the bounding wall of the chambers, it is preferred for there to be a substantial clearance. This facilitates removal and installation, and also provides for some interconnection of the regions between the vanes.

The vortex is schematically shown in FIG. 1. This device runs flooded without any regions occupied by gases. The flow through is in part the consequence of a differential pressure related to flow velocities.

This separator has many applications. At the present time this separator finds its most attractive use in the removal of solids from solvents used to clean automotive parts. Recycling the solids-laden solvent enables the solvent to be re-used, and the solids to be carried away in a condition suitable for ready disposal.

The dimensions of a suitable separator can readily be determined by the designer, depending on the anticipated volume of mixture to be treated, and on the volummetric through-put rate.

Instead of a continuous slot, the exit port can be formed as one or a plurality of angularly spaced apart individual openings through the wall of the separation barrel. The term "exit port" is intended to include both an individual port, a plurality of ports, and a continuous slot.

The terms "mixture", and "suspension" are used interchangably, and are intended to define liquid/solid combinations in which the solids can be separated from the liquids by their tendency to separate under centrifugal forces.

This invention is not to be limited by the embodiment shown in the drawings and described in the description, which is given by way of example and not of limitation, but only in accordance with the scope of the appended claims.

I claim:

1. In a separator for separating solids from liquid in a liquid/solid mixture, said separator being of the type which includes a separation barrel having a central axis a lower end, and an interior wall which is an axially-extending cylindrical surface of resolution, inlet means extending through said wall of said separation barrel to inject the mixture into said separator barrel in a spinning motion to separate solids from the liquid by centrifugal force, a spin plate in axial adjacency to said lower end of said separation barrel, an exit port from said separation barrel adjacent to said spin plate, a collection chamber having a sump region below said exit port for receiving solids-containing material which passes through said exit port, and an outlet barrel centrally aligned with said separation barrel axially above the spin plate to receive fluid reflected by said spin plate, the improvement comprising:

a plurality of planar baffles below said spin plate extending axially into said sump region and extending radially from said central axis to render the collection chamber more quiescent in order to facilitate the settling of solids in said sump region.

2. Apparatus according to claim 1 in which the edges of the baffles are spaced from surrounding structure.

3. Apparatus according to claim 1 in which said collection chamber further includes a quiescent region in said collection chamber above said exit port and in fluid communication with said sump region, and a conduit connecting said quiescent region and a region inside said separation barrel immediately above the spin plate on the central axis, said baffles also extending into said quiescent region.

4. Apparatus according to claim 3 in which the edges of the baffles are spaced from surrounding structure.

* * * * *